Oct. 23, 1923.

C. ANDRADE, JR 1,471,642

DIFFERENTIAL

Filed Aug. 25, 1922

Inventor.

Cipriano Andrade Jr.

Patented Oct. 23, 1923.

1,471,642

UNITED STATES PATENT OFFICE.

CIPRIANO ANDRADE, JR., OF NEW YORK, N. Y.

DIFFERENTIAL.

Application filed August 25, 1922. Serial No. 584,346.

*To all whom it may concern:*

Be it known that I, CIPRIANO ANDRADE, Jr., a citizen of the United States, residing at New York, in the county of New York and State of New York, have invented a new and useful Differential, of which the following is a specification.

My invention relates to roller locking differentials; and the object of my invention is to provide a differential more simple in construction than those now in use.

I attain this object by the mechanism illustrated in the accompanying drawings, in which—

Figure 1:
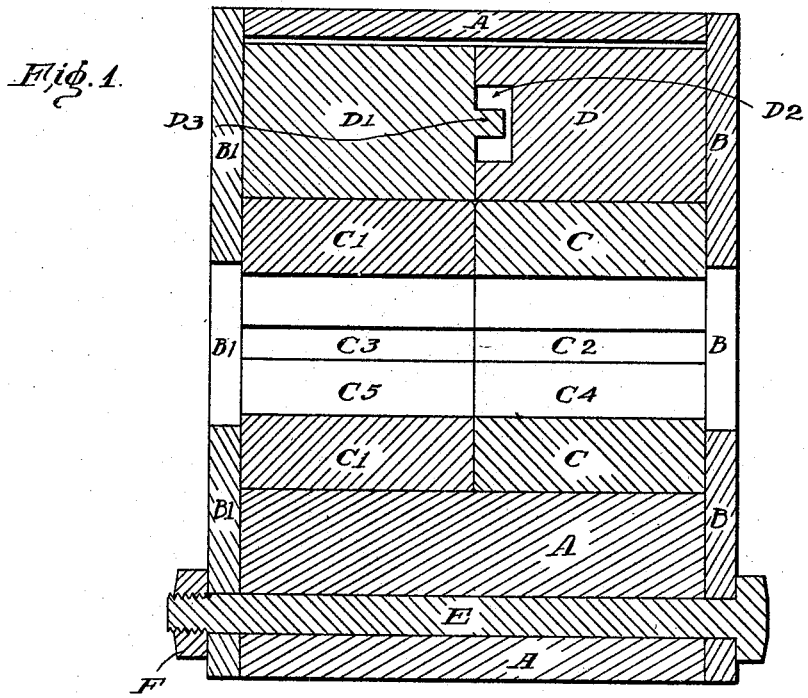
Figure 2:
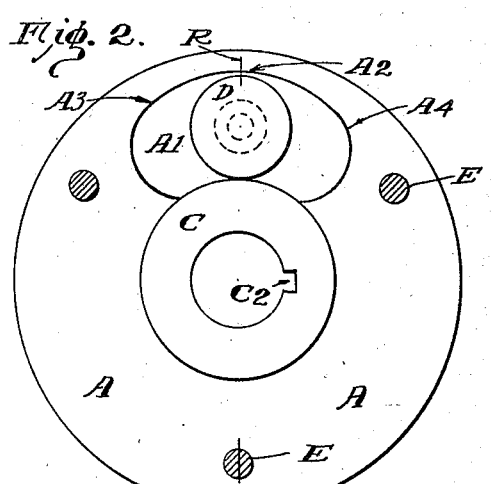
Figure 5:
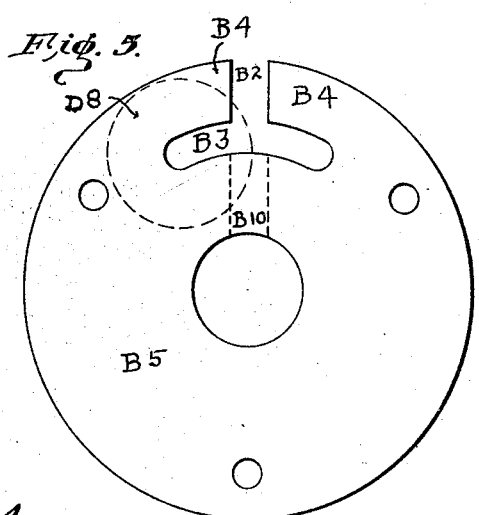
Figure 3:
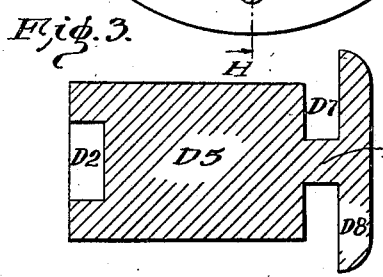
Figure 4:
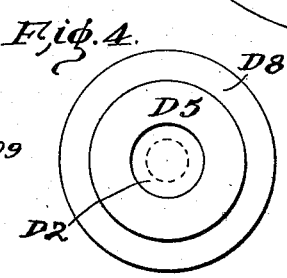

Fig. 1 is a longitudinal section elevation of the entire device on the line R H of Fig. 2; Fig. 2 is an end view of my device with the flange B removed. Fig. 3 is a longitudinal section elevation of another form of roller locking member $D^5$, with recess $D^2$, and a circumferential groove $D^7$ and a flange $D^8$ on neck $D^9$. Fig. 4 is an end view of Fig. 3. A similar groove and flange may be put on the other roller locking member with the projection $D^3$. Fig. 5 is another form of flange $B^5$ on the driving member, with slots $B^2$ and $B^3$, to admit neck $D^9$, and projections $B^4$ to enter groove $D^7$. Instead of slot $B^2$, slot $B^{10}$, indicated in dotted lines can be used to admit neck $D^9$ to slot $B^3$. Flange $D^8$ is shown in dotted lines in Fig. 5.

Instead of the solid flanges B and $B^1$ shown in Fig. 1 and Fig. 2, an alternative form of flange $B^5$ (Fig. 5) may be used, with circumferential slots $B^3$ and radial slots $B^2$ or $B^{10}$, said slots being adapted to contain neck $D^9$ of roller locking member $D^5$, the flange $B^5$ and projection $B^4$ being of such thickness as to allow a close sliding fit between flange $D^8$ and the body of roller locking member $D^5$, this combination of parts performing the quadruple function of (1) preventing the roller locking member $D^5$ from changing the direction of its axis, (2) permitting the roller locking member $D^5$ to rotate freely on its own axis, (3) permitting the roller locking member $D^5$ to move for a limited distance circumferentially with reference to the flange $B^4$ or $B^5$, (4) preventing the roller locking member $D^5$ from changing its position longitudinally.

Similar letters refer to similar parts throughout the several views.

A is the central portion of the driving member B A $B^1$ with flanges B and $B^1$ fastened to it by bolts E and nuts F. C and $C^1$ are driven members, with keyways $C^2$ and $C^3$ and openings $C^4$ and $C^5$ to hold the driven shafts. D is a cylindrical locking member with cylindrical opening $D^2$ at one end. $D^1$ is a cylindrical locking member, with cylindrical projection $D^3$ of smaller diameter than opening $D^2$ and of less length than roller D. $A^1$ is a transverse opening in the central portion A of driving member B A $B^1$. The radial distance between the periphery of driven members C and $C^1$ and $A^2$ is greater than the diameter of locking members D and $D^1$. The radial distance between the periphery of driven members C and $C^1$ and $A^3$ or $A^4$ is less than the diameter of locking members D and $D^1$.

It will be observed that flanges B and $B^1$ hold the driven members C and $C^1$ from longitudinal motion, and yet leave driven members C and $C^1$ free to rotate.

It will also be observed that flanges B and $B^1$ hold locking members D and $D^1$ from longitudinal motion, and yet leave locking members D and $D^1$ free to rotate, at the same time preventing locking members D and $D^1$ from changing the direction of their axes of rotation, said axes being at all times parallel with the axes of rotation of driving member B A $B^1$ and driven members C and $C^1$.

It will be observed also, that the difference between the diameters of recess $D^2$ and projection $D^3$ permits locking members D and $D^1$, while holding their axes parallel, to move relatively to each other circumferentially along the periphery of driven members C and $C^1$.

The operation of my device so far as relates to the rollers D, $D^1$ is familiar in the prior art, and my device permits differential motion of the two driven members either forward or reverse, and the power is always applied to the lower wheel.

The peculiar feature of my device resides in the novel means of the lug $D^3$ in combination with the recess $D^2$ to provide the necessary limited relative motion between rollers D and D¹, also in the alternative arrangement of flange D⁸ with slot B³ to effect the four functions enumerated in this specification.

I claim:

1. In a differential; a driving member with a recess in its surface, said recess having each of its sides lower than its central portion; a first and a second driven member with surfaces containing no recesses, a first locking roller between the said surface of the first driven member and one end of the recess in the driving member, and adapted to lock or unlock its said adjacent members either in a forward or reverse direction; a second locking roller between the said surface of the second driven member and the other end of the recess in the driving member, and adapted to lock or unlock its said adjacent members either in a forward or reverse direction; and means integral with said first and second locking rollers, whereby said first locking roller may move to a limited extent in relation to said locking roller circumferentially with reference to said driven members.

2. In a differential; a driving member with a recess in its surface, said recess having each of its sides lower than its central portion; a first and second driven member with surfaces containing no recesses, a first locking roller between the said surface of the first driven member and one end of the recess in the driving member, and adapted to lock or unlock its said adjacent members either in a forward or reverse direction; a second locking roller between the said surface of the second driven member and the other end of the recess in the driving member, and adapted to lock or unlock its said adjacent members either in a forward or reverse direction; a lug on the end of the first locking roller, said lug entering a recess in the end of the second locking roller, said recess being substantially larger in diameter than said lug.

3. In a differential, a driving member with a recess in its inner surface, said recess having each of its sides lower than its central portion; a first and a second driven member with outer surfaces containing no recesses, said outer surfaces of said driven members being inside of the inner surface of said driving member; a first locking roller between the said outer surface of the first driven member and one end of the recess in the driving member, and adapted to lock or unlock its said adjacent members either in a forward or reverse direction; a second locking roller between the said outer surface of the second driven member and the other end of the recess in the driving member, and adapted to lock or unlock its said adjacent members either in a forward or reverse direction; and means integral with said first and second locking rollers, whereby said first locking roller may move to a limited extent in relation to said second locking roller circumferentially with reference to said driven members.

4. In a differential; a driving member with a recess in its inner surface, said recess having each of its sides lower than its central portion; a first and a second driven member with outer surfaces containing no recesses, said outer surfaces of said driven members being inside of the inner surface of said driving member; a first locking roller between the said outer surface of the first driven member and one end of the recess in the driving member, and adapted to lock or unlock its said adjacent members either in a forward or reverse direction; a second locking roller between the said outer surface of the second driven member and the other end of the recess in the driving member, and adapted to lock or unlock its said adjacent members either in a forward or reverse direction; and a lug on the end of the first locking roller, said lug entering a recess in the end of the second locking roller, said recess being substantially larger in diameter than said lug.

5. In a differential; a driving member; a first driven member; a second driven member; a first cylindrical locking member having a recess at one end, and adapted to lock or unlock the driving member and the first driven member either in forward or reverse motion; a second cylindrical locking member adapted to lock or unlock the driving member and the second driven member either in forward or reverse motion, said second cylindrical locking member having a projection at one end, said projection being adapted to enter and be confined by the recess in the first locking member, the transverse dimension of said projection being substantially smaller than the transverse dimension of said recess, whereby said two locking members are capable of a limited circumferential motion in relation to each other.

6. In a differential; two cylindrical locking rollers located endwise with reference to each other; a projection at the end of one of said rollers; and a recess at the end of the other roller, said recess being of a larger sectional area than said projection, and adapted to contain said projection, whereby one roller is capable of a limited transverse motion in relation to the other roller.

7. In a differential; a driving member; a first driven member; a second driven member; a first roller locking member, with a recess at one end and a groove and a flange at the other end; a second roller locking member, with a projection at one end, and a groove and a flange at the other end, said projection being of smaller area than said recess and adapted to enter said recess, whereby one roller is capable of a limited transverse motion in relation to the other roller, a first containing flange rigidly affixed to the driving member, and containing a circumferential groove, whereby said first containing flange enters the groove in said first roller locking member and holds the same at a constant axial parallelism; and a second containing flange rigidly affixed to said driving member, and containing a circumferential groove, whereby said second containing flange enters the groove in said second roller locking member, and holds the same at a constant axial parallelism.

CIPRIANO ANDRADE, Jr.

Witnesses:
Guy W. Hodges,
Samuel S. Goorin.

Certificate of Correction.

It is hereby certified that in Letters Patent No. 1,471,642, granted October 23, 1923, upon the application of Cipriano Andrade, jr., of New York, N. Y., for an improvement in "Differentials," errors appear in the printed specification requiring correction as follows: Page 1, line 99, for the word "lower" read *slower;* page 2, line 25, claim 1, after the word "said" insert the word *second;* same page, line 31, claim 2, after the word "and" insert the article *a*, and lines 32 and 48, claims 2 and 3, and page 3, line 4, claim 7, strike out the comma and insert a semicolon; and that the said Letters Patent should be read with these corrections therein that the same may conform to the record of the case in the Patent Office.

Signed and sealed this 4th day of December, A. D., 1923.

[SEAL.]                                                   KARL FENNING,
*Acting Commissioner of Patents.*